United States Patent [19]

Tan et al.

[11] Patent Number: 5,064,669

[45] Date of Patent: Nov. 12, 1991

[54] METHOD OF MAKING CONTROLLED RELEASE FLAVORS

[75] Inventors: Chee-Teck Tan, Middletown; Young C. Kang, Oakhurst; Marion A. Sudol, Boonton; Chwan K. King, Edison; Marvin Schulman, Howell, all of N.J.

[73] Assignee: International Flavors & Fragrances, Inc., New York, N.Y.

[21] Appl. No.: 681,479

[22] Filed: Apr. 3, 1991

Related U.S. Application Data

[63] Continuation of Ser. No. 407,356, Sep. 14, 1989, abandoned.

[51] Int. Cl.⁵ .............................................. A23L 1/22
[52] U.S. Cl. .................................. 426/307; 426/650; 426/99
[58] Field of Search .......................... 426/650, 99, 307

[56] References Cited

U.S. PATENT DOCUMENTS

| | | | |
|---|---|---|---|
| 3,660,115 | 5/1972 | Revie | 426/99 X |
| 3,867,556 | 2/1975 | Darragh et al. | 426/99 X |
| 4,021,582 | 5/1977 | Hsu | 426/99 |
| 4,511,584 | 4/1985 | Percel et al. | 426/99 |
| 4,752,485 | 6/1988 | Sharma et al. | 426/99 |
| 4,753,807 | 6/1988 | Fuseya et al. | 426/99 |
| 4,806,370 | 2/1989 | Toyota et al. | 426/99 |
| 4,828,857 | 5/1989 | Sharma et al. | 426/99 X |
| 4,842,881 | 6/1989 | Kanemaru et al. | 426/99 X |
| 4,857,340 | 8/1989 | Parliment et al. | 426/99 X |

Primary Examiner—Joseph Golian
Attorney, Agent, or Firm—Brooks Haidt Haffner & Delahunty

[57] ABSTRACT

Novel controlled release flowable flavoring powders and processes and apparatus for preparing and using such agents, the processes comprising heating a high melting point encapsulating or enrobing material, such as a fat and/or wax and one or more emulsifiers to melt this starting material; mixing one or more water-containing flavor compositions with a texture conditioning agent; mixing the flavor compositions and texture conditioning agent(s) with the molten fat or wax to obtain a homogeneous mixture in the form of an emulsion; and chilling the flavor composition-containing mixture to provide discrete particles of solid encapsulated flavoring agent, together with the products so produced and methods for using same.

14 Claims, 4 Drawing Sheets

Spray Chilled EMC - 100x

Spray Chilled EMC (oil soaked) - 100x

Spray Chilled EMC (oil soaked) - 200x

Drum Chilled EMC - 100x

Drum Chilled EMC (oil soaked) - 100x

Drum Chilled EMC (oil soaked) - 100x

METHOD OF MAKING CONTROLLED RELEASE FLAVORS

This application is a continuation of application Ser. No. 07/407,356, filed Sept. 14, 1989 and now abandoned.

BACKGROUND OF THE INVENTION

The present invention relates to novel controlled release flavoring agents and to processes and apparatus for making and using such agents, and more particularly, it relates to generally solid flavoring agents which can be used to release flavors and aromas in a balanced manner, as for example for foods prepared in microwave ovens.

There is increasingly a need for flavoring agents which provide for a controlled release of flavor during heating or other phases of pre-consumption preparation. For instance, in microwave cooking, because the cooking time is so short, there is not enough time for foodstuffs cooked in microwave ovens fully to develop their flavor. Accordingly, there is a pressing need for flavors which can be added to microwave foods to impart desirable flavors to the foods.

The flavor for addition to microwave foods for cooking in a microwave oven can be a finished typical flavor of that food product or it can comprise precursors which will produce the typical flavor of the food product during the short cooking time. When flavors are incorporated into foodstuffs destined for microwave cooking, the flavors added will be subjected to microwave heating as the food is cooked by microwave. This requires that the added flavor should be able to withstand the microwave heating. While the food is being cooked in the microwave oven, steam is internally generated inside the food, and a steam distillation effect also results. Therefore, the added flavor must be able to remain in the food and not be steam-distilled out.

Encapsulation of flavors has been used in the past. Such encapsulation sought to protect the flavor from oxidation, to prevent it from evaporating, and to convert flavor products in liquid form to solid form. Conventionally, hydrocolloids such as starch, dextrin, maltodextrin, gum arabic, gelatin, and the like are used as the carriers or the encapsulation agents. Products of this type of encapsulation are water-soluble. In the flavor industry, the most common procedures for producing encapsulation products are spray drying, and to a lesser extent, extrusion and coacervation techniques.

For producing water-insoluble products, it has been customary to coat spray-dried powder or some other solid form of the flavoring materials with fat or wax. The application of the fat coating is commonly done by fluidized bed coating or spray chilling. When a spray-dried powder is used as the core material, the process is called double encapsulation.

British Patent 767,700 shows a method for making particles comprising encasing inner articles which contain a fat-insoluble vehicle carrying fat-soluble vitamins in a moisture-resistant substance in which the fat insoluble vehicle is insoluble. U.S. Pat. No. 3,186,909 relates to a method for melting a composition containing fatty alcohol esters derived from sperm whale oil, adjusting the composition to 90° C., adding urea to the composition and dissolving the urea, and adding fish liver oil and vitamins to prepare a homogeneous mixture.

U.S. Pat. No. 3,976,794 shows sweetened coconut products coated with a powdered sugar containing particles of sugar coated in edible fat. U.S. Pat. Nos. 3,949,094 and 3,949,096 show a process for preparing various flavorings, colorants, and flavor enhancers coated with various fats and emulsifiers, the process comprising spraying condiments which are intercepted by a second spray of certain edible coating materials. These prior art processes are capable of only putting limited quantities of flavor material into the finished product.

Except when spice powders or pure chemical powders, such as citric acid, ascorbic acid, and glucono-delta-lactone are used, the flavor loading in the fat-coated spray-dried powders is low, that is, the quantity of flavoring composition in the powder is relatively low. For example, in spray-dried flavor powders, the flavor loading is usually 20 percent. Extrusion encapsulated flavors usually have flavor loading of only 10 to 15 percent. When these powders have an additional coating on top of their original coating, the final loading of the flavor will be reduced still further. Depending on how much fat can be coated on the spray-dried powders, the flavor loading can drop to less than ten percent in double encapsulated powders. A flavor powder with only ten percent active flavor content is of lesser practical interest, unless the flavor is a very powerful one.

Therefore, there is a need for a process to make fat-encapsulated flavor with a high flavor loading and, at the same time, to control or balance the flavor release with the cooking temperature.

THE INVENTION

The present invention accordingly provides processes for preparing encapsulated flavors from solid, liquid, or mixed flavors. The release of the flavors from the encapsulated product is through the use of various solid products prepared according to this invention, and the encapsulated flavors can also provide a modified organoleptic perception or mouthfeel due to the high melting point ingredients.

Briefly, the process for preparing the novel particulate flowable flavoring powders of the present invention comprises heating a high melting point encapsulating or enrobing material, such as a fat and/or wax and one or more emulsifiers to melt this starting material; mixing one or more water-containing flavor compositions with a texture conditioning agent; mixing the flavor compositions and optional texture conditioning agent(s) with the molten fat or wax to obtain a homogeneous mixture in the form of an emulsion; and chilling the flavor composition-containing mixture to provide discrete particles of solid encapsulated flavoring agent. The chilling can be carried out on drum chillers or flakers or spray-chilling columns, as described herein. The powders of the discrete particles prepared according to the invention contain at least about ten percent of flavor composition.

The novel methods of this invention facilitate and enable the conversion of liquid, and particularly aqueous liquid, flavors to a readily usable powder form with both flavor oils and aqueous flavors. Flavors can contain up to 50 percent water. Most of the water is retained in the powder, and very importantly, the original fresh flavor is retained in the product. Moreover, the low temperatures permitted in the present processes cause little or no thermal damage to subtle flavor compositions. Generally, the flavor composition contains from about 15 to about 50 percent water, and in some preferred embodiments, from 30 to 50 percent water.

It has been found that the stability of the flavoring powders prepared according to this invention is the same as that of the original flavor composition under the same storage conditions, so that the flavoring powders are stable, while at the same time remain capable of releasing the desired flavor when heated in the course of normal food preparation. No caking of the flavor powder has been noted, even with storage at temperatures as high as 122° F. (50° C.).

The invention is further described with reference to the accompanying drawings wherein.

Figure 1:
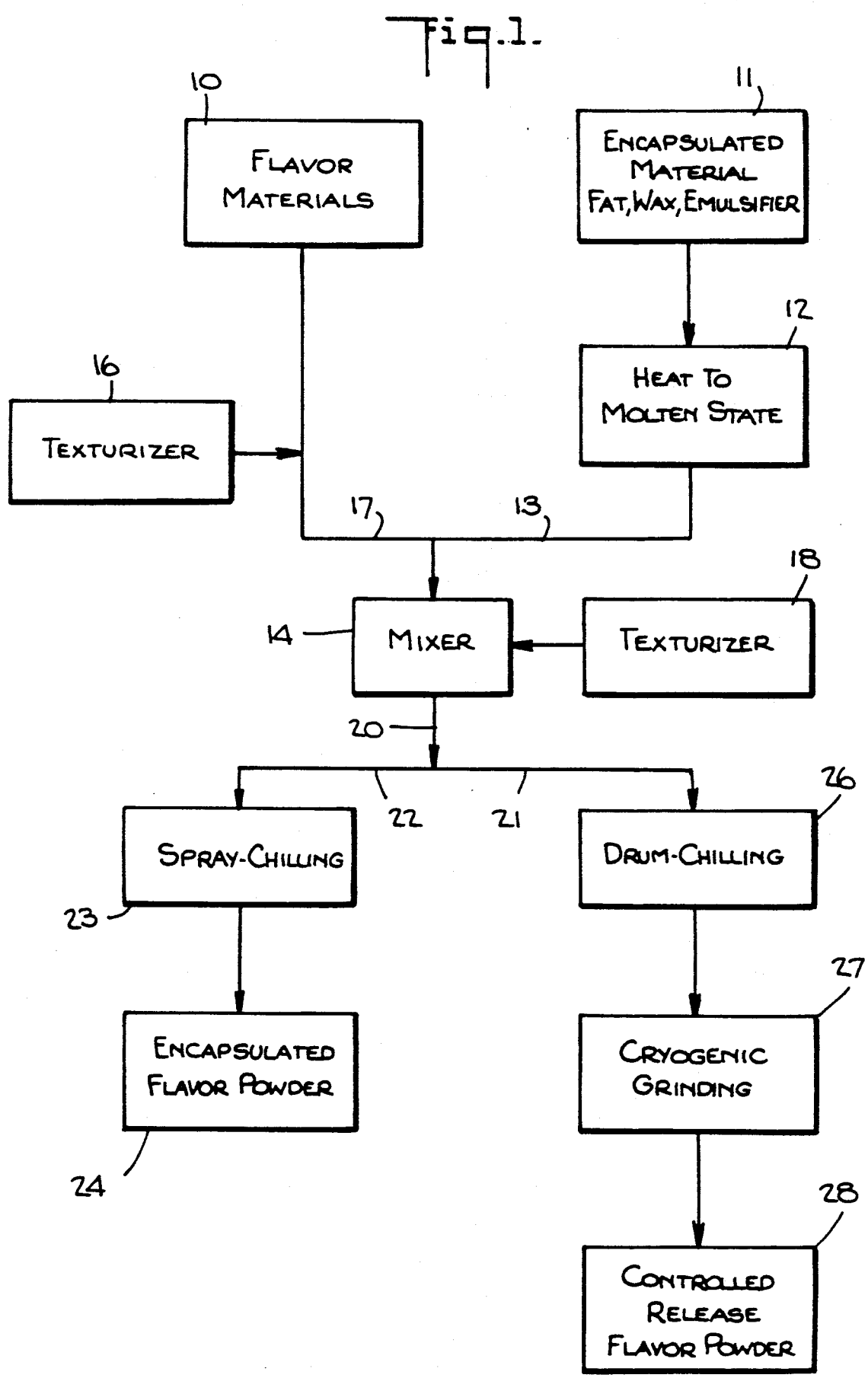
FIG. 1 is a flow diagram of processes for producing the solid flavoring particles.

The solid particulate flavoring agents according to this invention are materials having a melting point in the range of from about 130° F. to about 195° F. In certain preferred embodiments, the melting point is from about 135° F. to about 160° F.

The encapsulating materials are high-melting edible solids. In certain embodiments of the invention, it is desirable that the encapsulating materials have melting points of from about 130° F. to about 180° F. The encapsulating agents can be hydrogenated vegetable oils, stearins, and edible waxes. It is preferred in embodiments of the invention that fatty materials such as the vegetable oils or stearins having melting points of from about 130° F. to about 180° F. with relatively low free fatty acid and iodine values be utilized. It has been found desirable that the free fatty acid content of the fatty materials be no greater than 0.1 percent and that the iodine values be about five or less. Edible waxes can be obtained from vegetable, animal and/or mineral sources. These in certain desirable embodiments of the invention have melting points of from about 160° F. to about 195° F.

The high-melting point edible soluble materials, as taught above, include fatty materials and waxes. Certain materials which are particularly desirable for the practice of the invention include:

| Material | Melting Pt. (F.) |
| --- | --- |
| Hydrogenated vegetable oils | 130–160 |
| Partially hydrogenated cottonseed oil | 141–147 |
| Partially hydrogenated soybean oil | 152–158 |
| Partially hydrogenated palm oil | 136–144 |
| Mono- and diglycerides of fatty acids | 136–156 |
| Glyceryl monostearate | 158 |
| Glyceryl monopalmitate | 132 |

-continued

| Material | Melting Pt. (F.) |
| --- | --- |
| Propylene glycol monostearate | 136 |
| Polyglycerol stearate | 127–135 |
| Polyoxyethylene sorbitol beeswax derivatives | 145–154 |
| Fatty acid esters of polyoxyethylene sorbitan | 140–144 |
| Polyglycerol esters of fatty acids | 135–138 |
| Beeswax | 143–150 |
| Carnauba wax | 180–186 |

The encapsulating materials according to the present invention include emulsifiers, and in many embodiments emulsifiers for water-in-oil emulsions. In certain desirable embodiments, the emulsifiers are edible monoglycerides, sorbitol monoesters, or lecithins. The monoglycerides are those prepared from edible fats and oils by known techniques. It has been found desirable that these materials contain at least 90 percent monoglyceride. A variety of lecithins can be utilized; the lecithins used are preferably oil-free with at least about 95 percent acetone insolubility.

The particulate flavor compositions can also desirably contain a texture conditioning agent. As used herein, a texturizing agent is a material which will absorb or hold the flavor composition. In certain embodiments of the invention, these are desirably silicon dioxide, powdered cellulose, or puffed dextrin, maltodextrin, and pregelatinized starches.

Silica used as a texture conditioning agent herein has a particle size in the range of 50 to 200 micrometers. Such silica may be produced by spray drying aqueous silica suspension. The porous structure thereby produced readily absorbs liquids while at the same time maintaining the flowability properties of the silicon dioxide. In certain embodiments of the invention, this silica can be crushed to reduce the particle size thereof to less than 20 micrometers. Comminuted silicas such as those produced from fumed silica and dehydrated silica gels can also be used.

The powdered cellulose for use according to the present invention can be obtained by a dry mechanical process. Such cellulose powder contains approximately 90 percent beta-1,4-glucan and 10 percent of a hemicellulose such as xylan, araban, mannan, galactan, and the like. The high absorbency of this material for both fat and water enables it to be used to provide structure for the encapsulated powders of certain embodiments of the present invention.

The dextrin, maltodextrin, and pregelatinized starches ave the capability of absorbing large quantities of water and oil. They are especially suited for use with water-based flavoring compositions according to the present invention.

As used herein, the term flavoring compositions includes one or more materials capable of imparting a flavor to, enhancing a flavor in, or modifying the flavor of a consumable material. They can be conventional flavoring compositions or they can be especially adapted to improve the flavor characteristics of foods to be prepared in a microwave oven.

The quantity of flavoring composition in the solid flavoring agents according to this invention can be varied over a range. The quantity thereof will depend upon the particular foodstuff with which it is to be associated, whether the cooking will be done totally by microwave heating, a combination of microwave and induction heating, or by more conventional methods. The quantity of flavoring composition will also vary according to the packaging of the foodstuff, the length of time expected prior to consumption, the expected storage temperatures and other conditions, and the overall flavor impression desired. It will be appreciated by those skilled in the art that to some extent the flavor of food is frequently subjectively evaluated. Consequently, there is room for considerable variation. The quantity of flavoring composition in the solid flavoring materials of the invention also will depend upon the quantity of such materials to be added to the food. If a small quantity is added, the amount of flavoring material should be larger; the additional larger quantities of the solid flavoring material can entail the use of less flavoring composition.

It has been found that it is desirable to use relatively large quantities of flavoring composition in the particulate flavoring material of the invention. This reduces the amount of solid flavoring material to be added. The physical form of the solid flavoring material according to this invention provides for a good distribution of even small quantities throughout the foodstuff with which it is used. Accordingly, it is desirable that the quantity of flavoring composition be from about 30 to about 70 percent of the overall composition. In certain preferred embodiments, the flavoring materials comprise from 40 to 60 percent of the particulate flavoring material.

It will be understood herein that a flavoring composition is one capable of imparting a definite flavor to a tasteless or bland foodstuff, and a flavor-enhancing composition is one capable of reinforcing one or more flavor notes of a natural or other material which is deficient in flavor. A flavor-enhancing composition would be useful for improving the flavor of, say, a meat product, the flavor of which was diminished or undesirably altered by the processing. It will accordingly be understood that the flavoring compositions can include flavoring ingredients, carriers, vehicles and the like to form compositions suitable for imparting a flavor to, enhancing the flavor in, or altering the flavor of, a food composition, and such food compositions and the methods for preparing them are included in this disclosure.

The flavoring compositions can be used to enhance existing flavors in, or to provide the entire flavor impression to, a foodstuff. They can include organic acids including fatty, saturated, unsaturated and amino acids, alcohols, including primary and secondary alcohols, esters, carbonyl compounds including aldehydes and ketones, lactones, cyclic organic materials including benzene derivatives, alicyclics, heterocyclics such as furans, pyridines, pyrazines and the like, sulfur-containing materials including thiols, sulfides, disulfides and the like, proteins, lipids, carbohydrates, and so-called flavor potentiators such as monosodium glutamate, guanylates, inosinates, natural flavoring materials such as vanillin, and the like. It will be appreciated that the types and amounts of materials selected from the foregoing groups of materials will depend upon the precise organoleptic character desired in the finished product and, especially in the case of flavoring compositions used to enhance other flavors, will vary according to the foodstuff to which the flavor and aroma are to be imparted. Inorganic materials such as sodium chloride and freshness preservers such as butylated hydroxyanisole, butylated hydroxytoluene and propyl gallate can be added for their adjuvant preservative effects on the flavoring composition or on the final food composition itself.

As noted above, the flavoring compositions can include carriers such as gum arabic and carrageenen or vehicles such as ethyl alcohol, water, propylene glycol. When the carrier is an emulsion, the flavoring composition can also contain emulsifiers such as mono- and diglycerides of fatty acids and the like. With these carriers or vehicles the desired physical form of the composition can be prepared. It will be understood that the flavoring compositions can initially be in spray-dried, liquid, encapsulated, emulsified and other forms in which flavorings are added to foodstuffs.

The particulate flavoring agents for microwave foods according to this invention can be added to the food products by the manufacturer during preparation of the microwave foods in the plant. Alternatively, they can be added by the consumers before putting the microwave food into the microwave oven or after the food is partially cooked in the microwave oven. Among these different methods of adding flavors to microwave foods, the most appropriate and convenient for consumers is adding the flavor during manufacturing of the food product.

The present invention provides novel processes for the production of the encapsulated flavoring agents according to the invention. The methods are based on interaction of the thermal, mechanical, and electrical properties of the materials. The nature of the cooling process affects the product. The encapsulated materials according to this invention are profoundly affected by the transmission and absorption of electrical energy and by the heat and mass transfer modes occurring within the product during preparation and use. Microwave energy used in food preparation generally penetrates the materials to a depth of only a few centimeters.

The processes of the present invention rest upon the chilling of the materials on either a drum chiller or in a spray chilling column.

These processes will now be described with reference to FIG. 1. Flavor materials are placed in vessel 10 and the encapsulating material and emulsifier are placed in vessel 11. The encapsulating material and emulsifier are heated in step 12 and proceed through line 13 to mixer 14. The mixer can be any device capable of well mixing liquids or liquids and solids. It has been found useful to utilize a Premier or a Lightning mixer for this purpose. A texture conditioning agent shown in 16 is optionally added to the flavor material in vessel 10 and fed through line 17 to mixer 14. If desired, a texture conditioning agent at 18 can be supplied to mixer 14.

After mixing is completed, the mixed flavor composition and encapsulating material can be converted to particulate form either by spray-chilling or by drum-chilling. Thus, material is withdrawn from the mixer through line 20 and sent either through line 21 to a drum-chilling operation or through line 22 to a spray-chilling operation. The spray-chilling is carried out as shown in 23 and the solid flavor material is obtained as a product at 24. In the alternative, the material from line 21 is fed to drum chiller 26 which converts it to a thin sheet. The thin sheet is then cryogenically ground at 27 to produce the controlled release flavor particles at 28. The particular apparatus used is further described herein.

According to the selective diffusion concept of the present invention, the transport of both water and volatile aroma components in an encapsulated system in the absence of internal circulation paths is governed by molecular diffusion. The loss of flavoring components is controlled by diffusivity and is nearly independent of the relative volatility. Some time after fat starts to solidify, as the feed material contacts the chilled drum, the interfacial water concentration has dropped to such a low value (the "critical value") that the diffusion coefficients of flavor compounds are so much lower than those of water that virtually no more flavoring is lost. The surface of solidified thin film fat layer then behaves as a semipermeable "dry skin." With the selective diffusion concept, the effect of different parameters on retention of volatiles in chilling can be explained in terms of the influence of these parameters on the dimensionless Fourier number $D*t/L^2$, where D is the diffusion coefficient of the volatile, L is the average thickness of solidifying layer, and t is the chilling time.

The shorter the time required to lower the water content at the surface of the droplet to an activity smaller than 0.95, the higher will be the aroma retention. At a surface water activity below 0.95, which corresponds to the end of the constant rate cooling period, the surface of the droplets becomes selectively permeable to water and starts to retain the larger aroma molecules.

Spray-chilling of the liquid mixtures according to the present invention is particularly advantageous. It affords high throughput an requires only simple equipment. In practice, a spray column, such as a Bowen column is fitted with a disc atomizer or with a spray chill nozzle, the latter of which is disclosed hereafter.

The air temperature for the spray chilling can be varied over a wide range. While chilled air at low temperatures such as 40° F. or 50° F. can be used, generally the air temperature can be ambient temperatures of from 65° F. to 85° F. Temperatures up to 116° F. (46° C.) have been used successfully. Thus, temperatures from 40° F. to 120° F. can be used, and it is preferred in certain embodiments to use temperatures of 65° F. to 85° F.

It will be appreciated from the foregoing that the spray-chilling contemplated herein can be accomplished by utilizing a simple spray chamber, and the chilled powder product can be readily recovered and collected. In one embodiment, a cyclone separator is used after the spray chamber to separate the powder product from the air and collect the powder.

As taught herein, a disc atomizer can be used. Such atomizers generally are used at rotational speeds of 10,000 to 25,000 rpm. It has been found according to the invention that a modified nozzle can give superior results in certain embodiments of the spray-chilling route.

Figure 3:
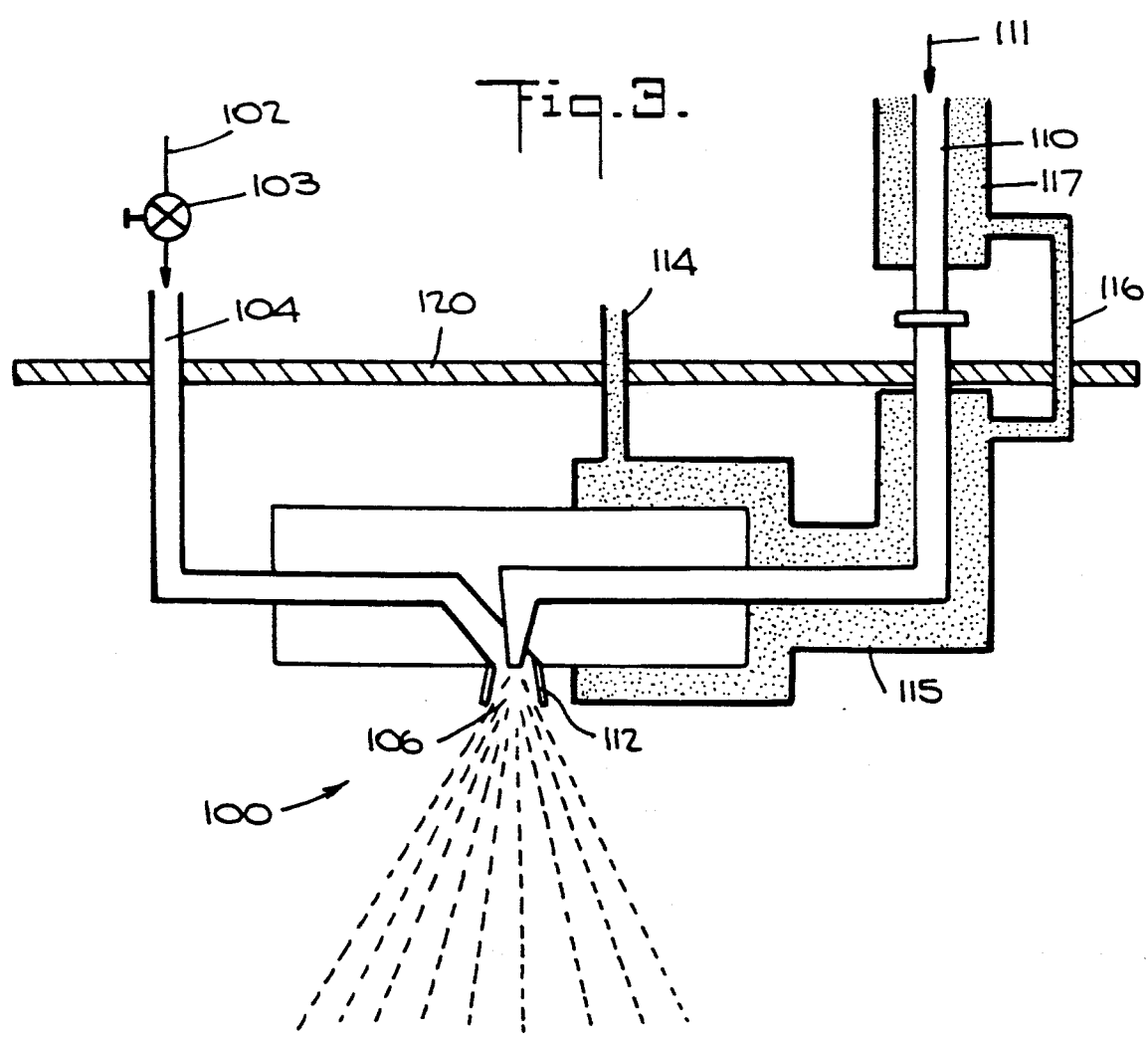
FIG. 3 is a diagram partially in section of a modified spray chill nozzle used to practice a process according to the present invention.

FIG. 3 shows nozzle assembly 100 in partial section. Clean dry compressed air is fed from line 102 through valve 103 into conduit 104 which communicates with nozzle opening 106. The fluid mixture of encapsulating material, emulsifier, texturizing agent, and water-containing flavor composition is fed from the mixer (not shown) via line 110 to conduit 110. The side of the nozzle containing conduit 110 is fitted with steam jackets 115 and 117, the jackets being connected through line 116. Steam at, say, five pounds per square inch, gauge, is introduced into jacket 115 through conduit 114. The nozzle is supported in the spray chiller (not shown) by plate 120.

The liquid feed passes through line 111 and meets the air which surrounds it coaxially at jet 112. The liquid material is thereafter chilled to solidify the encapsulating agent and provide the finished product as described.

Figure 2:
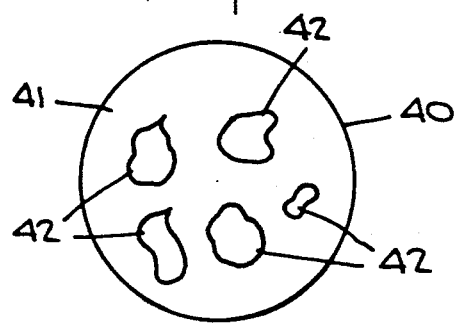
FIG. 2 is a representation in section of one particle of flavor material powder prepared according to one aspect of the invention.

The core material in this embodiment consists of silicon dioxide absorbed by water and water-soluble constituents and surrounded by an emulsified fat layer as illustrated in FIG. 2. In this simplified representation wall 41 of particle 40 is comprised by material which constitutes a thin layer of solidified enrobing or encapsulating material. Cores 42 in this embodiment are comprised of finely comminuted silicon dioxide particles having absorbed thereon water and water-soluble flavoring materials. Particle 40 affords a balanced retention and a controlled release of flavor upon heating preparatory to consumption of the foodstuff containing the particles.

Figure 4:
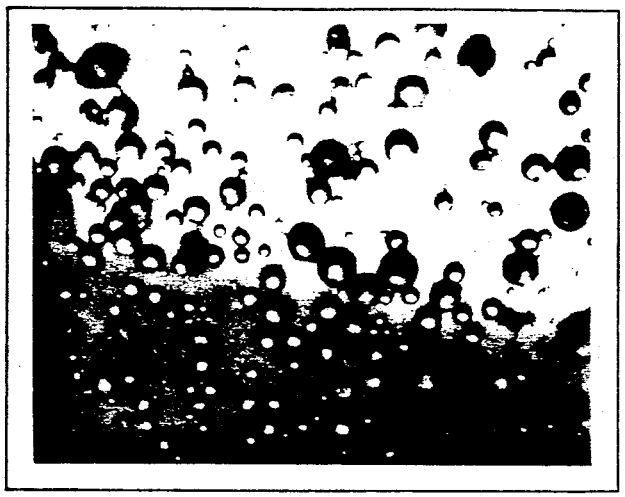
FIG. 4 is a photomicrograph of spray-chilled particles according to the invention.
Figure 5:
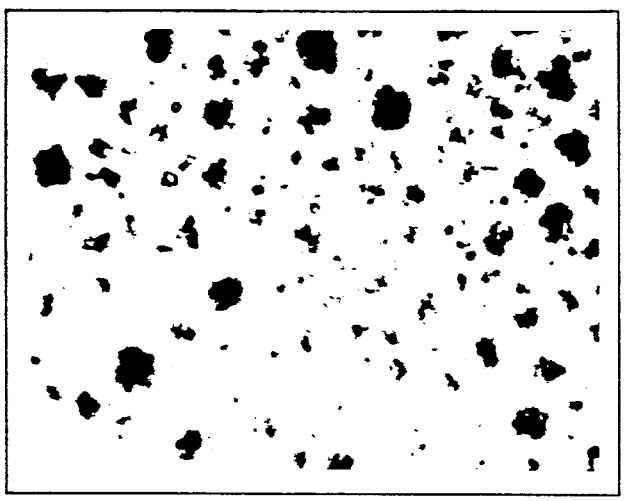
FIG. 5 is a photomicrograph of oil-treated particles to illustrate the invention.
Figure 6:
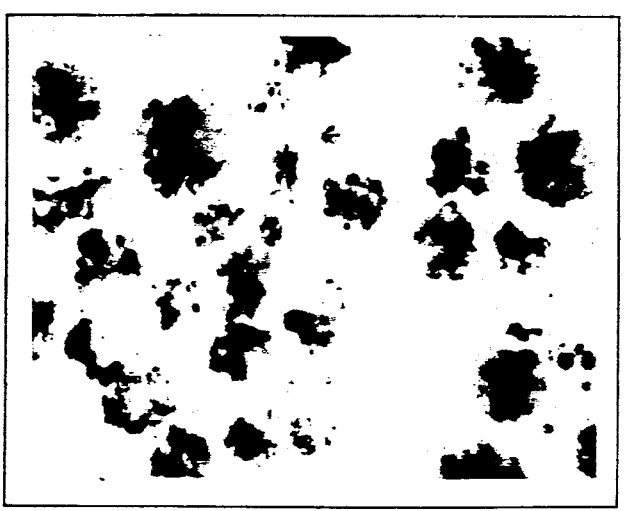
FIG. 6 is a photomicrograph of particles at twice the magnification shown in FIG. 5.

Under microscopic examination, it has been found that the spray-chilled cheddar cheese formulations, the enzyme-modified cheese flavor material is encapsulated by fat on the outside, as shown in FIGS. 4 and 5. In FIG. 5 the fat layer in the particles has been rendered translucent by soaking with immersion oil to reveal the enzyme-modified cheese inside the particles. FIG. 6 is a view of the same type of particles at 200× magnification, twice that of FIG. 5. The emulsifier used allowed the system to form a water-in-oil emulsion, and the spray-chilling keeps the water-in-oil emulsion in the solid stable powder form.

Figure 7:
FIG. 7 is a photomicrograph of particles of the present invention produced with drum cooling.
Figure 8:
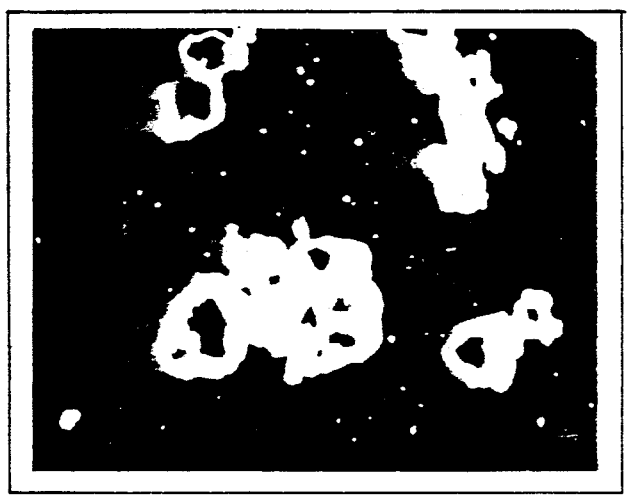
FIG. 8 is a photomicrograph of oil-treated particles to illustrate products of the invention.
Figure 9:
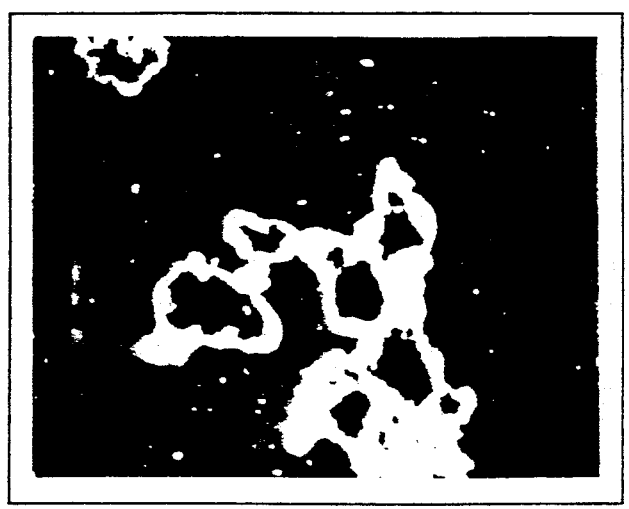
FIG. 9 is another photomicrograph of particles similar to those of FIG. 8.

FIG. 7 is a photomicrograph of drum-chilled particles at 100×, while FIGS. 8 and 9 are particles soaked in immersion oil to reveal the internal structure more clearly. With the drum-chilled powder, the effect of the encapsulation of flavor by the fat is reduced due to the process of granulating the flakes from the drum-chiller. Even so, the performance of the drum chilled powders is quite good and provides an inexpensive route for converting liquid flavors into powder form.

The microwave heating of food containing this particulate flavoring results in a substantially instantaneous temperature rise within the product by internal heat generation. Thus, high surface temperatures are not employed in microwave heating. For a composite product, different regions have different thermal and dielectric properties and different water activities. The center core with its high moisture and the dissolved flavoring material control the release of the encapsulated flavorings during microwave heating. This leads to the development of encapsulated flavors with greater retention of heat-sensitive flavor constituents. Under steady-state conditions, heat transferred from an external source, i.e., the quantity of microwave power absorbed, is exactly balanced by the latent heat of moisture absorbed by the silicon dioxide.

Microwaves are a type of electromagnetic wave between common infrared and radio waves. Microwave heating does not come from outside the product. As the microwaves pass through the product, molecules (water and others) try to align themselves like magnets to the microwave electromagnetic field. Since this field reverses about a thousand million times per second, the energy produced in the transition from an ordered form to a random form is converted into heat. The result is almost instantaneous heat. Therefore, microwave heating offers two basic advantages: speed of heating and quality of the final product.

In embodiments of this invention, the novel encapsulated system described herein provides microwave flavoring, the product is improved by controlled release of the flavor by time delay to release the volatile aroma due to the difference of dielectric properties between the core material (silicon dioxide saturated with available water) and the wall material (fat with emulsifier).

With these considerations, in preparing the flavoring particles of this invention by drum chilling, increasing the residence time (lowering the rotation speed) gives no quality improvement. In a 4 rpm (15 second) rotation, almost all the heat is exchanged during the first two seconds. Two processing variables which are important to the encapsulation process on chilled drums are the distance between the drums and the cooling temperature. These affect the energy flux rate, which closely relates to capacity and product quality. For lesser thickness, the solidifying time is very short, and the quality and cooling rate is much improved. The other processing variable is the drum chilling temperature.

All parts, percentages, proportions, and ratios herein are by weight, unless otherwise indicated.

The following Examples are given to illustrate embodiments of the invention as it is presently preferred to practice it. It will be understood that these Examples are illustrative, and the invention is not to be considered as restricted thereto except as indicated in the appended claims.

EXAMPLE I

PREPARATION OF ENCAPSULATED ENZYME MODIFIED CHEESE

A 500 g fat mixture composed of 95% of a partially hydrogenated fat (capillary tube melting point: 152°–158° F.) and 5% of a distilled monoglyceride (melting point: 156° F.) is heated to 180° F. to provide a fluid mixture. A 500 g portion of an enzyme-modified cheddar cheese (containing 50% moisture) is mixed with 51.4 g of silicon dioxide. Then, the two mixtures are mixed together until well blended. The temperature of the mixture is maintained at 180° F. The final homogeneous mixture is atomized through a nozzle into a chamber having a high velocity cold air flow in and out of it, namely in this instance a spray dryer. In the chamber, the liquid fat mixture in the form of a fine mist solidifies into a fine powder. This fine powder is collected in a cyclone separator. The particle size of the powder ranges from 50 to 300 microns, with about 70% of the particles in the range of 150 to 250 microns. The bulk density of this powder is about 0.47 g/ml.

Microscopic examination, after the spray chilled powder is soaked with microscope immersion oil to make the powder particles translucent, shows that the non-oil soluble enzyme modified cheese proteinaceous materials are imbedded inside the particle as a water-in-oil emulsion (as shown in the FIG. 5 photomicrograph).

EXAMPLE II

The spray-chilled enzyme modified cheese powder in Example I is used to prepare a one-step cheese-flavored popcorn with the following composition:
Corn: 70.00 g
Cheese powder containing flavored shortening: 30.00 g
Salt: 2.00 g
FD&C Color: 1.00 g The spray chilled enzyme modified cheese powder prepared according to Example I comprises about five percent of the weight of the flavored shortening.

The corn/shortening blend is placed in a special microwave popcorn bag and heat-sealed. For popping, the corn in the sealed bag is placed in a microwave oven, using full power, and heated for 3.5 minutes. The popping results show that, after popping, the cheese flavor distribution on the corn is very even, and no lumping and overbrowning of the corn occurs in the bag.

In contrast, when straight spray-dried cheese or enzyme modified cheese powder is used in the shortening, the popping results show lumping of the cheese powder, and the powder overheats and chars in the bag. When enzyme modified cheese is directly popping, the enzyme-modified cheese forms lumps and chars in the bag. Morever, a homogeneous mixture of the cheese powder and shortening cannot be prepared.

A further advantage of the particles prepared according to the presently claimed invention is that the flavoring can be placed directly into the bag with the corn to be popped. Conventional products heretofore required that the flavoring material be added in some sort of a separate container, such as a bag or pouch, which then had to be ruptured and poured over the corn kernels prior to heating.

EXAMPLE III

CHEESE SAUCE MIX FOR NOODLES (PARMESAN CHEESE)

Enzyme-modified Parmesan cheese is used in place of enzyme-modified cheddar cheese as described in Example I to make a fat-encapsulated cheese flavor powder. The particle size analysis of this powder is as follows:

| Sieve Size | Diameter (microns) | Percent Retained |
| --- | --- | --- |
| No. 60 | 250 | 18.7 |
| No. 100 | 150 | 65.6 |
| No. 140 | 105 | 13.4 |
| No. 170 | 88 | 0.65 |
| No. 325 | 44 | 1.65 |

The bulk density of this cheese flavor particulate product is 47.35 g/100 ml. Its moisture content is in the range of 15 to 20 percent.

This powder is added at the rate of 2.5 to 5 percent to a mixture of dried corn syrup, cultured nonfat milk, salt, natural flavors, whey, sodium caseinate, modified starch, oleoresin carrot color, and lactic acid to prepare a creamy cheese sauce mix.

The finished noodles are prepared by combining 320 ml hot water, 175 ml milk, 20 g margarine, 150 g noodles and 15 g of the creamy cheese sauce mix in a medium saucepan; the cheese sauce and noodles are stirred and brought to a boil. While gently boiling, the mixture is stirred frequently and held for about six minutes. The noodles are ready to serve. The sauce provides a good Parmesan cheese flavor. The flavor is stronger than that obtained with a sauce prepared from spray-dried enzyme-modified Parmesan cheese.

The noodles are also prepared in a microwave oven, instead of on a conventional range. The same composition of water, milk, noodles and sauce mix are placed in a microwavable casserole. The mixture is stirred to mix it well before the casserole is placed in the microwave oven. The uncovered casserole is heated in the microwave oven at the high power setting for 8.5 to 10 minutes. The sauce on the noodles provides a strong fresh Parmesan cheese flavor.

EXAMPLE IV

An enzyme-modified cheese (containing 50% moisture) in the amount of 300 g is mixed into 700 g of a fat mixture composed of 95% Durkee 17 stearin and 5% Myverol 1806 distilled monoglyceride. The mixture is spray-chilled as in Example I to produce a powder.

EXAMPLE V

The same enzyme-modified cheese and fat composition as in Example IV is used with an addition of 51.4 g of Sipernat 50S silicon dioxide to the cheese flavor before mixing into molten fat. The mixture is spray-chilled as in Example I. This Example V powder is considered firmer in texture and not as soft in feel and drier to the touch than the powder produced in Example IV.

EXAMPLE VI

Enzyme-modified cheese paste in the amount of 240 g is mixed with 35.1 g of Sipernat 50S silicon dioxide texture-conditioning agent. After mixing with the silicon dioxide, the paste becomes stiff and drier. The mixture is then blended into 360 g of a molten fat mixture composed of 95% Durkee 17 stearin and 5% Myverol 1806 monoglyceride mixture. The final mix is maintained at 170° F. (71° C.). It is poured onto an atmospheric double drum dryer which has cold water (about 60° F. or 16° C.) flowing in the drums. The drum unit has a 6-inch diameter, 7⅝ inch long drums with an adjustable drum speed of 1.2 to 12 rpm. The drums are arranged with axes of rotation parallel and are adjusted to drum spacings of 0.010 to 0.012 inch. With the drum rotating inward relative to the pool of feed material, the product is evenly spread and the thickness is controlled by the clearance in the nip between the drums.

Feed material is delivered by peristaltic pump through heated and insulated piping to distribute it between the center of the drums. The product remains on the drum throughout 270 to 300 degrees of rotation, during which time rapid cooling occurs in the thin film. The product is removed by two doctor blades. The retention time is controlled by the drum rotation speed.

The feed tank is a 30-gallon jacketed vessel with mixer. The ingredients of the feed materials are maintained in liquid form in the feed tank using the medium pressure steam. The drums are run at about 10 rpm. The collected flakes are coarsely ground in an appropriate size reduction machine to provide the desired particle size. It is generally desirable that the particles pass through a 10-mesh or smaller screen.

In one embodiment, the chilled flakes from the drum are passed to a KEK-Gardner centrifugal sifter or grinder/sifter and passed through a No. 18 sieve. The flakes are most preferably ground while they are still as cool as possible from the chiller drums. If the flakes are allowed to warm, they can be chilled again before size reduction, but those skilled in the art will appreciate from the present disclosure that it is quite desirable to avoid another chilling step and directly to size the particles after the drum chilling.

The size reduction device or mill utilized desirably has a gentle grinding action and low heat build-up. One mill used in certain embodiments of the invention is the Kemutec Betagrind. The rotating bars of this mill or grinder do not scrape the cone as is the case when a Colton Granulator is utilized. In practice, a cone size of 2.5 mm is used to produce 10-mesh flakes at the rate of about 50 to about 120 lbs/hr. The Kemutek centrifugal sifter can be used to produce 10-mesh and 18-mesh product at throughput rates of about 240 to 470 lbs/hr, with a 30 percent recycle to provide minus 10-mesh product and a 50 percent recycle to provide a minus 18-mesh product.

This powder is tested as a flavoring for microwave popcorn and found to be superior to adding spray-dried flavor powder or enzyme-modified cheese itself in the popcorn bag. The drum-chilled powder of this invention evidences no browning or lumping in the bag. Browning and lumping are found in the spray-dried powder and the enzyme-modified cheese itself. The powder of the invention imparts a good flavor to the popcorn.

EXAMPLE VII

Fried onion paste in the amount of 400 g is mixed with 400 g of a fat mixture composed of 95% Durkee 27 stearin and 5% Myverplex 600 concentrated glyceryl monostearate. The molten fat mixture is drum chilled as described in Example VI. The powder is superior in flavor to a corresponding spray-dried control sample which did not employ fat.

EXAMPLE VIII

A drum-chilled mixture is prepared according to the following formula:

| Ingredient | Amount (parts) |
|---|---|
| Enzyme modified cheese | 50 |
| Sipernat 50S silica | 8.6 |
| Fat mix | 41.4 |

Following the procedure described in Example VI, a flavor powder is prepared. This flavor powder has a strong cheese flavor. The enzyme-modified cheese content in this flavor powder is 50%.

EXAMPLE IX

USING MONOGLYCERIDES AS THE MAIN ENCAPSULATING OR ENROBING AGENT

An enzyme-modified cheese in the amount of 300 g is mixed into 700 g of Myverol 1806, a monoglyceride. The melted fat mixture is spray chilled as described in Example I. The product is capable of imparting a desirable cheese flavor to a variety of food products.

EXAMPLE X

SPRAY-CHILLED OIL SOLUBLE FLAVOR

A spray-chilled yellow cake flavor is prepared according to the following formula:

| Ingredient | Parts by weight |
|---|---|
| Myverol 1806 monoglyceride | 13 |
| Durkee 17 stearin | 52 |
| Yellow cake flavor powder | 31 |
| Yellow cake flavor oil | 4 |

Following the procedure in Example I, a flavor powder is prepared. The fat-encapsulated yellow cake flavor is evaluated in microwave yellow cakes against a spray-dried yellow cake flavor. The cakes are baked in a 700-watt microwave oven for 6 minutes. The cake containing the fat encapsulated yellow cake flavor is rated better than the cake containing spray-dried cake flavor.

EXAMPLE XI

SPRAY-CHILLED BUTTER FLAVOR OIL (AN OIL SOLUBLE FLAVOR)

Butter flavor oil in the amount of 500 g is mixed with 2000 g of a fat mixture of 70% Durkee 27 stearin and 30% Myverol 1806 monoglycerides. The melted fat mixture is spray drier chilled as described in Example I.

EXAMPLE XII

SPRAY-CHILLED FLAVOR PREPARED WITH FLAVOR PRE-ABSORBED IN ABSORBENTS

Butter flavor oil in the amount of 500 g is mixed with 500 g of Solka-Floc cellulose powder. The flavor oil in cellulose powder is mixed with 1000 g of Durkee 17 stearin. The melted mixture is spray-chilled as in Example I to produce a powder. The cellulose powder can be replaced with starch, maltodextrin, and other high liquid-absorbency powder form materials, such as beet fibers, orange juice sacs, and the like.

EXAMPLE XIII

USE OF OTHER HYDROPHILIC ABSORBENCY MATERIALS IN PLACE OF SILICON DIOXIDE IN THE SPRAY CHILLED FLAVORS

Example I is repeated with the silica successively being replaced with Solka Floc cellulose powder, beet fiber powder, maltodextrin, pregelatinized starch, dextrins, orange juice sacs, hyrocolloids, wheat flour, and soy protein isolates to provide flavoring powders according to the present invention.

EXAMPLE XIV

A mixture is prepared to contain the following ingredients in the amounts indicated:

| Ingredient | Amount (g) |
| --- | --- |
| Durkee 17 stearin | 832.0 |
| Centrolex-F lecithin | 34.0 |
| Honey | 1000.0 |
| Sucrose | 94.0 |
| Sipernat 50S silica | 40.0 |
| Total | 2000.0 |

The lecithin is added to the stearin and these ingredients are melted in an electrically-heated kettle. The honey is warmed to 180° F. in a water bath, and the sucrose is added with stirring. When the lecithin-stearin blend reaches 185° F., the mixture of honey and sucrose is added to the kettle, the contents of which are agitated for five minutes, whereupon the silica is added and the kettle contents are stirred for another five minutes.

The fluid kettle contents are then fed to a Bowen spray tower fitted with a steam-jacketed air nozzle which serves to atomize the fluid. The pressure setting for the air flow is seven inches of water. The air temperature is about 70° F.

This Example illustrates the use of lecithin, a natural emulsifier, to enable the incorporation of honey, a water-containing material, into the fat system. It is found that honey has a special property which will make water-in-oil (W/O) emulsions. Thus, a fat encapsulated honey powder can be achieved. The honey content of this encapsulated powder is 50%.

What is claimed is:

1. A process for preparing particulate flowable flavoring powders comprising heating a high melting point normally solid encapsulating material having a melting point of from 130° F. to 195° F., and at least one emulsifier to melt the encapsulating material and emulsifier; admixing the melted encapsulating material and emulsifier; mixing at least one water-containing flavor composition containing at least 15 percent water with a texture conditioning agent which is a silicon dioxide, powdered cellulose, puffed dextrin, maltodextrin, or pregelatinized starch; mixing the flavor composition and texture conditioning agent with the molten mixture of encapsulating agent and emulsifier to obtain a homogeneous mixture in the form of an emulsion; and chilling the flavor composition-containing mixture to provide discrete particles of solid encapsulated flavoring agent, the encapsulating material and emulsifier being different.

2. A process according to claim 1 wherein the encapsulating material is a fat or wax having a melting point in the range of from 130° F. to 195° F.

3. A process according to claim 1 wherein the encapsulating material is at least one hydrogenated or partially hydrogenated vegetable oil, stearin, fatty glyceride ester or partial ester, or an edible wax.

4. A process according to claim 3 wherein the encapsulating agent is a partially hydrogenated cottonseed oil, a partially hydrogenated soybean oil, a partially hydrogenated palm oil, a glyceryl monostearate, a glyceryl monopalmitate, a propylene glycol monostearate, a polyglycerol stearate, a polyoxyethylene sorbitol, a fatty acid ester of polyoxyethylene sorbitan, a polyglycerol ester of a fatty acid, beeswax, or carnauba wax.

5. A process according to claim 1 wherein the emulsifier is at least one mono- or diglyceride of a fatty acid.

6. A process according to claim 1 wherein the flavor composition contains from 15 to 50 percent water.

7. A process according to claim 1 wherein the flavor composition contains from 30 to 50 percent water.

8. A process according to claim 1 wherein the quantity of flavor composition is from about 20 to about 40 percent of the weight of the homogeneous mixture.

9. A process according to claim 1 wherein the quantity of texture conditioning agent is from about 0.1 to about one times the amount of flavor composition.

10. A process according to claim 1 wherein the homogeneous mixture is chilled by spraying the mixture into a stream of gas, the gas having a temperature of from 40° F. to 116° F.

11. A process according to claim 10 wherein the spraying is carried out with a centrifugal atomizer.

12. A process according to claim 10 wherein the homogeneous mixture is admixed with compressed air and sprayed through a nozzle.

13. A process according to claim 1 wherein the mixture is chilled by contact with a surface at a temperature less than the melting point of the encapsulating material to form flakes.

14. A process according to claim 13 wherein the flakes are reduced in size to pass through a No. 10 screen.

* * * * *